No. 829,085. PATENTED AUG. 21, 1906.
J. A. PERKINS.
END THRUST RESISTING MEANS FOR BEARINGS.
APPLICATION FILED NOV. 11, 1903.

Witnesses:
Fred S. Greenleaf
Warren D. Owen

Inventor.
Julius A. Perkins,
by Crosby Gregory
attys.

UNITED STATES PATENT OFFICE.

JULIUS A. PERKINS, OF OMAHA, NEBRASKA, ASSIGNOR TO MOFFETT BEARING COMPANY, OF COUNCIL BLUFFS, IOWA.

END-THRUST-RESISTING MEANS FOR BEARINGS.

No. 829,085.     Specification of Letters Patent.     Patented Aug. 21, 1906.

Application filed November 11, 1903. Serial No. 180,727.

*To all whom it may concern:*

Be it known that I, JULIUS A. PERKINS, a citizen of the United States, residing at Omaha, in the county of Douglas and State of Nebraska, have invented an Improvement in End-Thrust-Resisting Means for Bearings, of which the following description, in connection with the accompanying drawings, is a specification, like letters on the drawings representing like parts.

This invention has for its object a novel construction of means for resisting end thrust in bearings, especially bearings such as shown in United States Patent No. 713,058, granted November 11, 1902, to R. D. Camp, my invention being also, it will be understood, applicable to any form of bearing where it is desired to resist successfully the wear and shock due to end thrust in opposite directions. In the patent referred to a series of balls in a ball-race of a ring surrounding the axle contact with a ring in the end of the hub or box, which ring serves the purpose of a cage-controller. In the embodiment of my invention shown in the accompanying drawings, showing preferred forms of construction, I employ between the main ring or track (as I prefer herein to designate the so-called "ring" of said patent) and the end of the tenon of the axle a plurality of sets of balls, each in its own ball-race, one set of said balls traveling over said main track, the second set traveling over a plane surface parallel with that part of the main track with which the set of balls coacting with it contact. These balls constituting antifriction means are shown as applied to two ball-races made at opposite sides of an end-thrust plate disconnected from the hub or box and surrounding the axle. The main track serves the purpose of a cage-controller, while the second set of balls contacts with a plane surface shown as a track sustained by an extension of the box.

Figure 1:
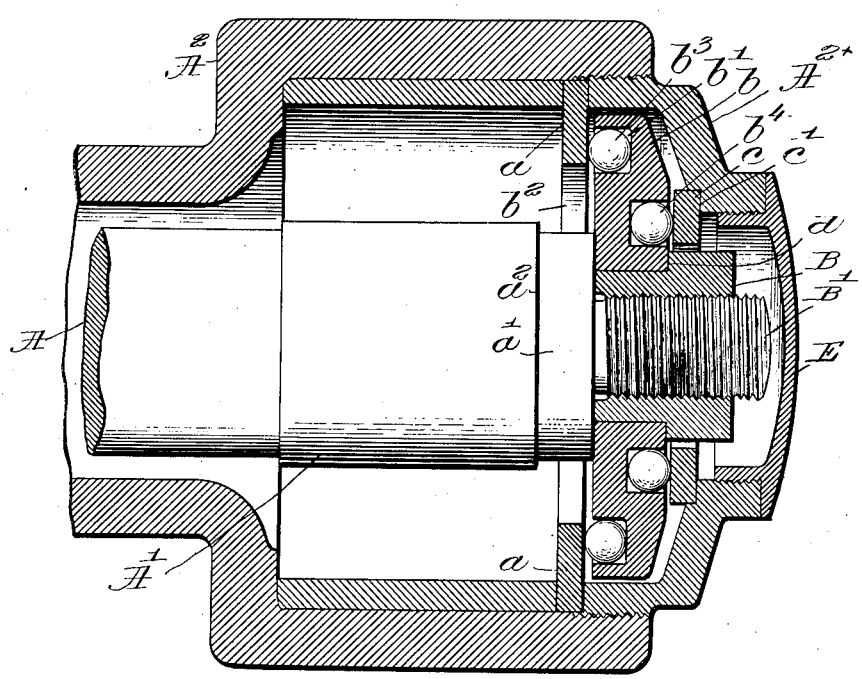
Figure 2:
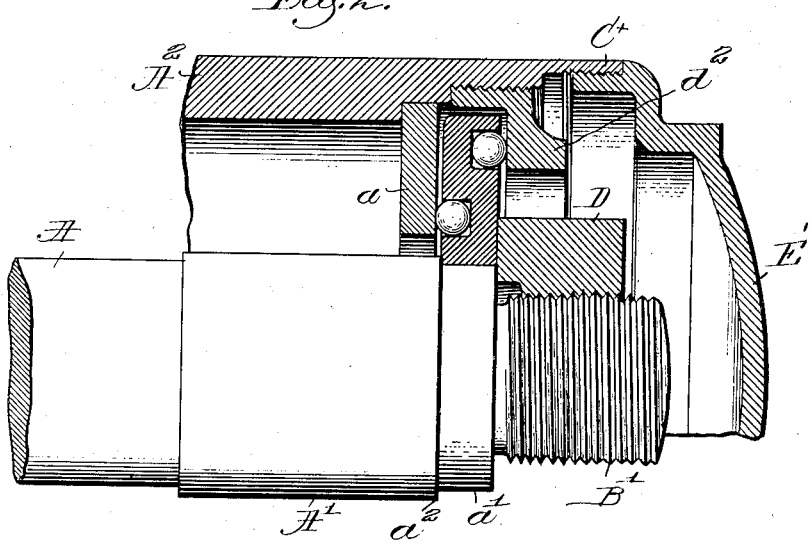

Figure 1 shows in section a sufficient portion of a hub or box and part of an axle with my improvements added to enable my invention to be understood, and Fig. 2 shows a modification to be described.

The axle A and its enlargement A', over which may roll usual short bearing-rollers held in cages, (not shown, but fully illustrated in said patent,) there being preferably two such enlargements on the axle surrounded by the hub or box $A^2$, the track $a$ at the extremity of the box, and the nut B, applied to the threaded tenon B', are and may be shaped as fully shown in said patent. Herein the track $a$ is mounted loosely in the hub or box end. In Fig. 1 the axle is reduced somewhat in diameter at the inner end of the tenon, as at $a'$, leaving a shoulder $a^2$. A screw-thread at the outer end of the hub or box receives a threaded extension $A^{2\times}$, that is closed by a removable cap E, that may be used for the exclusion of dust from the box or hub. The inner end of the extension is shown as substantially abutting the outer face of the track $a$. The nut B is surrounded by end-thrust means, which in practice will include a plurality of balls $b^3$ $b^4$. These balls are contained in separate ball-races shown as formed in an end-thrust plate, one set, as $b^3$, of said balls traveling over the main track $a$, which also serves the purpose of a cage-controller, the other or second set of balls traveling over a plane surface at right angles to the longitudinal axis of the axle and parallel with the face of said main track. The plane surface or second track $c$ is shown as detached from, but as surrounding, the axle, so as to move with the hub or box.

In the particular construction shown in Fig. 1 the series of balls $b^3$ contact with the main track $a$, and the end-thrust plate $b$ is maintained in working position by a shoulder $d$ on the nut B, while the series of balls $b^4$ are made to contact with and roll over the second track $c$, shown as seated in an annular recess or pocket $c'$ in the box extension.

In the modification, Fig. 2, the main track $a$ is shown wider than in Fig. 1 and as located farther within the end of the hub or box, and the ball-race having the balls running on the main track is of less diameter instead of the greater diameter, as in Fig. 1, and the second track $d^2$, the equivalent in function and purpose of the track $b$, is sustained by its engagement with screw-threads at $C^\times$, the cap $E^\times$ being screwed into said extension. In Fig. 2 the shape of the nut D on the tenon differs slightly from the nut B, the main track is made wider, and the ball-race next the main track occupies a position nearest the axle.

I believe that I am the first to provide for use with a hub or box having at its end a main track that also serves the purpose of a cage-controller, a plurality of sets of balls each moving in a separate ball-race, one set of said balls traveling over said main track, while the second set of balls travels over a plane surface parallel to said main track and constituting a second track. I further believe that I am the first to provide an end-thrust plate with antifriction means at both sides, and hence my invention is not to be limited to the exact construction shown of the end-thrust means or to the particular location with relation to each other of the annular grooves containing the antifriction devices.

The tracks sustained by or through the box rather than by or through the tenon of the axle or its nut are set in place in the hub or box and in the cap and are held therein frictionally instead of being fixed to the hub or box and the cap, and said tracks may be turned in the hub or box and in the cap, and consequently I designate said tracks as being applied loosely to the hub or box or the cap, and said tracks may be rotated in said hub or box or said cap.

Having described my invention, what I claim, and desire to secure by Letters Patent, is—

1. In a roller-bearing, a hub or box, a main track located at the end of said hub or box and serving as a cage-controller, an axle having a tenon, combined with a ball-sustainer having grooves at its opposite sides, a second track parallel with the main track, and balls located in the grooves of said sustainer, one set of balls contacting with one and the other with the other track.

2. In a roller-bearing, an axle, a hub or box, two tracks within said box at one end, and an interposed end-thrust plate having annular grooves located at different distances from the center of said plate, said grooves receiving each a set of balls, one set of balls contacting with one of said tracks and the other with the other of said tracks.

3. In a roller-bearing, a hub or box, an axle having a tenon and two tracks applied loosely to said box and capable of moving therewith, combined with a ball-sustainer having a plurality of annular grooves, and a set of balls in each of said grooves.

4. In a roller-bearing, a hub or box, an axle having a tenon at its outer end, end-thrust means surrounding said tenon and presenting two sets of balls or antifriction devices, combined with two tracks in one end of the box and disconnected from the axle, said tracks being located at opposite sides of said end-thrust means.

5. In a roller-bearing, a hub or box, an axle having a tenon, and two tracks disconnected from the axle and maintained separated one from the other with an open space between them, combined with end-thrust means comprising a plate having annular grooves at its opposite sides and interposed between said tracks, and a series of balls in each of said grooves, said balls contacting with the inner sides of said tracks.

6. In a roller-bearing, an axle having a tenon, a hub or box, two tracks separated one from the other and sustained thereby, combined with an end-thrust washer surrounding the tenon of the axle and interposed between said tracks, said washer having antifriction means coacting with the inner sides of said tracks.

In testimony whereof I have signed my name to this specification in the presence of two subscribing witnesses.

JULIUS A. PERKINS.

Witnesses:
GEO. W. GREGORY,
EDITH M. STODDARD.